United States Patent Office
3,224,850
Patented Dec. 21, 1965

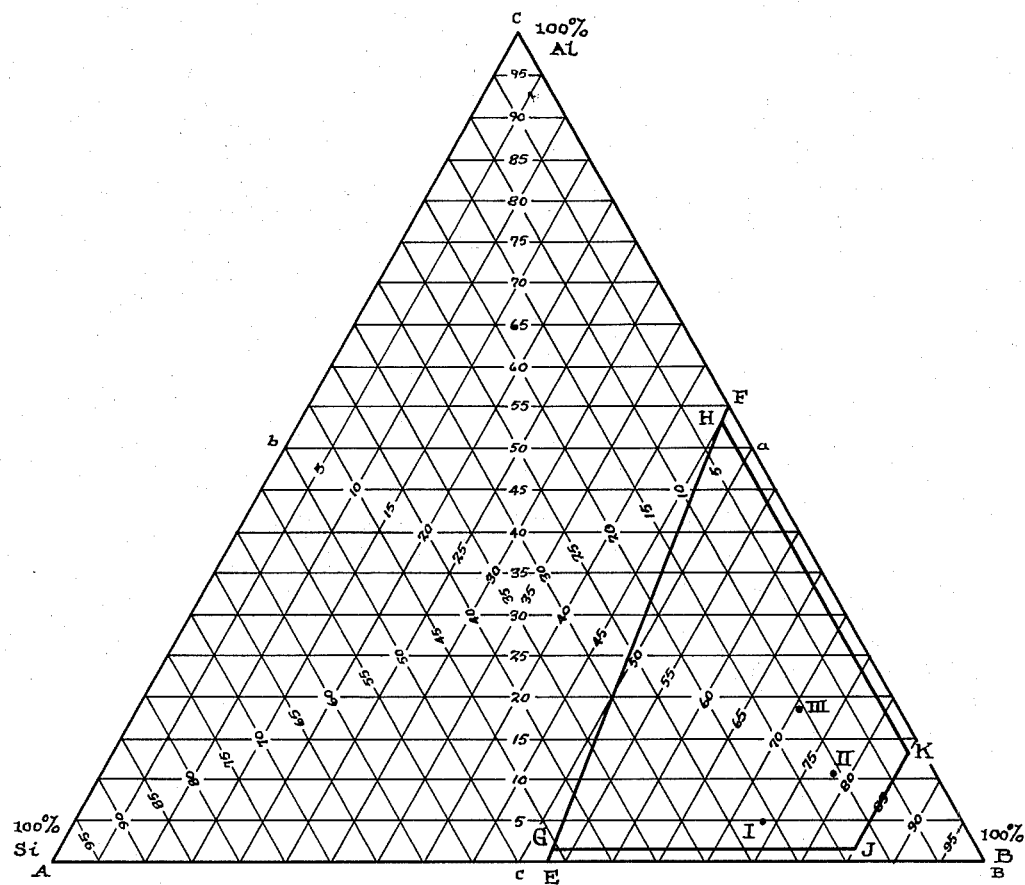

3,224,850
SILICON ALUMINUM BORIDE COMPLEX
Norman P. Robie, Hamburg, N.Y., assignor to Electro Refractories & Abrasives Corporation, Buffalo, N.Y.
Filed Apr. 5, 1962, Ser. No. 185,275
7 Claims. (Cl. 51—298)

This invention relates to certain new and useful compositions of matter in the general family of metal borides and to mixtures of these borides and combined carbide. Since my new compositions are both highly refractory and very hard and tough, they are useful in the fields of refractories and abrasives. Moreover they are lighter and less dense than most other materials used for these purposes, a property which increases their desirability as will be explained further below.

My improved method of manufacture uses inexpensive raw materials, including in many cases alkali borates as set forth in my copending application Ser. No. 178,275 filed Mar. 8, 1962.

As will become further apparent below my invention has several objectives:

One object of this invention is to make comparatively light, low specific gravity refractories.

Another object of this invention is to provide light weight abrasive wheels which will rotate with less centrifugal stresses, making possible higher operating speeds with greater safety and efficiency.

Another object of this invention is to provide abrasives whose density is so much lower than conventional abrasives that they may be separated from mixtures with conventional abrasives by easier, less costly, gravity methods.

Another object of this invention is to provide abrasives which will abrade boron carbide.

Another object is to make highly refractory materials which upon exposure to oxidizing gases oxidize superficially and automatically coat themselves with a protective oxide layer which retards further oxidation.

In the art as hitherto practiced metal borides have not had the extensive commercial development they warrant, because of their high cost of manufacture. According to Schwarzkopf and Kieffer's book "Refractory Hard Metals—Borides—Carbides—Nitrides—Silicides," there are six methods of making borides, namely:

(1) Fusion of metal and boron.
(2) Sintering of metal and boron.
(3) Reduction of boric oxide and metal oxide.
(4) Metal or metal oxide is reacted with boron carbide, with or without addition of boric oxide and a reducing agent.
(5) Electrolysis of fused salt baths containing metal oxide and boron oxide.
(6) Vapor phase deposition from metal and boron halides.

In 1, 2, and 4 above, metal hydrides may be substituted for the metal.

All the above processes as described in this well known authority are comparatively expensive. My new material is on the contrary made from clay, feldspar and other inexpensive ingredients reacting with borax and carbon.

It may be noted that in comparison with my new light materials conventional abrasives are relatively heavy with specific gravities approximately as follows:

| | Gms./cc. |
|---|---|
| Diamond | 3.5 |
| Silicon carbide | 3.2 |
| Fused alumina | 3.95 |
| Fused zirconia-titania (85%–15%) | 5.3 |
| Fused zirconia | 5.8 |

These abrasives because of their high specific gravities require greater weights of abrasive to make an abrasive wheel than do my new lighter materials. This not only increases material costs but yields wheels which are more likely to burst when rotated at high speeds.

The accompanying triangle diagram FIG. 1 illustrates the compositional area in which I desire that my new materials should fall. In this diagram, point E represents $SiB_3$ and point F—$AlB_2$. The weight percentage compositions of these compounds is:

| | Percent Si | Percent Al | Percent B |
|---|---|---|---|
| $SiB_3$ | 46.5 | | 53.5 |
| $AlB_2$ | | 55.5 | 44.5 |

I connect points E and F with line EF and on this line mark points G and H at compositions containing 2% of Al and Si respectively. I then draw through point G a line GJ extending toward the boron corner of the diagram parallel to the nearby base line, and through point H a similar line HK parallel to the base line near it. These lines I continue to the points J and K representing 85% boron in the composition and then connect J to K to define an area GHKJ.

It is my desire that in my compositions the ratios of Si:Al:B shall be such as to bring them within the area GHKJ of the diagram.

As just indicated, line GJ separates compositions with at least 2% of Al from those with less, while line HK separates compositions with at least 2% Si from those with less. Line JK defines compositions with 85% of boron. I find this percent of boron to be about as high as is practical in materials made by my method due to the volatility of the boron. Also it is desirable that at least 15 parts of silicon plus aluminum be present to impart mechanical toughness to abrasives and oxidation resistance to refractories of the type I produce.

In addition to these elements and boron however I may have present up to 30% by weight of carbon, mostly in combined form and probably chiefly as boron carbide. I have found that all compositions distributed widely over this area are capable of abrading boron carbide whereas in compositions lower in boron than line GH, this has not been true.

Analyses of the materials which abraded the boron carbide showed from 20 to 30% by weight of carbon.

The aluminum and silicon borides may be mixed together in any proportion within the area GHKJ of the diagram to yield highly refractory bodies which upon exposure to oxidizing conditions become coated with tightly adherent oxide coatings which retard further oxidation, particularly withbodies containing 10% or more of Si. The high Al bodies however are more refractory. All these materials are also quite resistant to heat shock when bonded as will be discussed later. They may also be bonded to form abrasive wheels which are far lighter than those of the conventional abrasives listed above.

In the manufacture of my new materials I find it desirable to fuse together low cost ores which may or may not contain an alkali, as the source of my aluminum and silicon, with the boron usually added in the form of anhydrous borax, fusing these together with carbon at high temperature as for instance in an arc furnace. Typical metal containing ores are listed in Table I.

TABLE I

| Component | Kaolin Clay | Pyrophyllite | Feldspar | Nephylene Seyenite | Kyanite | Ceramic Frit | Petalite | Spodumene |
|---|---|---|---|---|---|---|---|---|
| $SiO_2$ | 46.42 | 79.25 | 73.0 | 60.4 | 61.65 | 65.0 | 76.10 | 64.5 |
| $Al_2O_3$ | 38.60 | 16.23 | 15.53 | 23.6 | 38.45 | | 17.30 | 27.3 |
| CaO | 0.07 | 0.08 | | 0.7 | | | 0.05 | 0.21 |
| MgO | 0.22 | 0.02 | | 0.1 | | | | |
| $Na_2O$ | | 0.20 | 3.0 | 9.8 | | 5.0 | [1] 0.56 | 0.15 |
| $K_2O$ | 0.35 | 1.64 | 7.8 | 4.6 | | | | 0.25 |
| $Fe_2O_3$ | 0.41 | 0.09 | 0.04 | 0.07 | 0.29 | | 0.03 | 0.65 |
| $TiO_2$ | 0.27 | 0.11 | | | | | | |
| $B_2O_3$ | | | | | | 30.0 | | |
| $LiO_2$ | | | | | | | 4.45 | 7.35 |
| Ign | 13.98 | 2.35 | 0.41 | 0.7 | | | | 0.40 |

[1] As $K_2O$.

I may also admix silica or alumina with these ores or with each other when this is needed to provide a final fusion of a composition not attainable by using the ores alone.

When I arc fuse alkali borates or other sources of boron with silicon-aluminum minerals such as those in Table I in the presence of sufficient carbon either as such or in the form of carbides of aluminum, silicon or boron sufficient to make CO of any oxygen in the charged materials, I get a silicon aluminum boride complex which is not only extremely hard but very light compared with conventional abrasives. High boron content favors greater hardness and lower specific gravity.

All mixtures of the materials within Area GHKJ have low specific gravities, all being 3.0 or less even when admixed with up to 30% of carbon. My low weight abrasives of this type are extremely hard, scratching silicon carbide very easily and in many cases boron carbide.

My new materials made in this way, are either a mixture of silicon and aluminum borides or a solid solution of one of the borides in the other with possibly excess boron or combined carbon present. In either case the properties described are attained and the reduced material may be used in the manner and for the purpose indicated.

In the course of the fusion in which my material is formed, considerable material is volatilized and driven off in heavy fumes. These include most of the alkali present and also a certain amount of the boron and silicon. I add sufficient carbon to the mix to be fused to form CO with all the combined oxygen present and this CO together with the alkali, etc., provides a copious evolution of vapor.

By restricting the top opening of the furnace, the strong evolution of these alkali vapors along with carbon monoxide, helps purge the furnace of oxygen thereby providing a low cost non-oxidizing atmosphere. When silicon carbide is used as a source of silicon and as the reducing agent the reaction appears to proceed smoother with borax than when boric oxide is used as a source of boron due to the fluxing action of the alkali.

While several types of furnaces may be used to carry out the reduction reactions, I have used a simple arc furnace. A carbon crucible formed the bottom electrode and a vertical up and down adjustable electrode was suspended into the crucible opening. While I used a single phase furnace, I am aware that there are more efficient three phase furnaces. The crucible was deep and partially enclosed so as to keep as much oxygen out of the reaction chamber as possible aided by the copious fumes evolved. The raw materials may be added in increments and the power regulated to keep the furnace operation smooth and steady. I can alternatively use resistance and/or induction furnaces.

In the examples which I cite below by way of illustration but not for limitation, I show the use of anhydrous borax and boric oxide as sources of boron but it should be understood that other sources of boron may be used as may prove economical and still yield a product within the scope of my invention.

The following examples will illustrate the various aspects of my invention:

*Example I*

The feldspar whose analysis is shown in Table I was mixed as follows and reacted in the arc furnace:

| | Parts |
|---|---|
| Feldspar | 100 |
| Boric oxide | 255 |
| Anhydrous borax | 184 |
| Carbon | 232 |

The above was calculated to yield a theoretical mixture containing $SiB_6$—71% and $AlB_{12}$—29%. This corresponds with Point I on the chart. Analysis showed 23.9% carbon in the product. The fusion was smooth running with a good yield of metal boride which scratched silicon carbide very easily. Its density was 2.57 and its PCE above cone 35. The alkali in the feldspar and borax did not harm the product, passing off as vapors.

*Example II*

A fusion was made using the kyanite ore listed in Table I admixed with anhydrous borax and carbon in the ratio:

| | Parts by weight |
|---|---|
| Kyanite | 100 |
| Borax | 923 |
| Carbon | 367 |

This was calculated to yield 65 parts of $AlB_{12}$ and 35 parts of $SiB_6$. This corresponds with Point II on the chart. The fusion ran smoothly, yielding a very hard product with a specific gravity of 2.47. This abraded silicon carbide readily and scratched boron carbide. Analysis showed it contained 16.5% of carbon.

*Example III*

Another fusion was made using the kyanite ore listed in Table I in the following mix:

| | Parts by weight |
|---|---|
| Kyanite | 100 |
| Anhydrous borax | 558 |
| Carbon | 244 |

This was calculated to produce 35% $SiB_6$ and 65% $AlB_6$. This corresponds to Point III on the chart. The product had a specific gravity of 2.91 and was hard enough to abrade SiC with ease.

When this material was crushed through a 100 mesh screen mixed together and pressed with 3% of a temporary binder and then fired in an oxidizing atmosphere for one hour at 2450° F. it adhered firmly to make a strong refractory block with a heavy glaze on its outer surface.

In addition to the abrasive properties recited for my various examples some of the fusions seem to have unusual toughness compared with pure simple metal borides. All have very high melting points. All of the products contain ingredients which form a protective glaze as they oxidize. All are good electrical conductors.

The lightness of my Al-Si-B-C mixtures (specific gravity 3.0 or less) taken together with their extreme infusibility makes them particularly useful for use in constructing air-borne and aerospace refractories where minimum weight is at a premium. I find that they have excellent sintering or self bonding ability where bodies formed from them are fired to around 2450° F. They may also be bonded with the common ceramic bonds such as ball clay, mullite or fine alumina and fired to the temperature required to mature the bond selected.

Such bodies also have excellent resistance to spalling upon sudden temperature change. As noted earlier, exposure to hot oxidizing gases causes them to glaze over and retard further oxidation. These properties exist even when my fusions are simply crushed to desirable grit sizes, pressed with a temporary binder such as 3% of dextrin and then fired. In general however, their density is lowered and refractoriness increased by removing any residual borates, etc., from the fused mass before bonding the material. This can be done by crushing the crude mass through a 10 mesh screen, reaching it with hydrochloric acid and washing with water. In the process of crushing and sizing my material I fined the less pure fraction tends to powder down further than the purer stock, so that it is advantageous to sift out any extreme fines (say through 200 mesh) before attempting to used my material as described.

For use as a light weight abrasive, the material is similarly processed, then sifted into desired grit sizes in accord with general abrasive practice or for bonding with a synthetic phenol formaldehyde bond the grits may be used without cleaning them. These sized abrasive grits are then bonded by usual grinding wheel bonding methods, as for instance the following:

Mix 90 parts of crushed 20 to 60 grit material with 7½ parts by weight of phenolic resin such as Varcum Chemical Co's. No. 1364 and 2½ parts of their No. 8121 resin. Both No. 1364 and No. 8121 are phenol formaldehyde resins commonly used for making grinding wheels, the former being a powdered resin and the latter being a liquid resin. From this by the methods common to the abrasive industry and bake up to 350° for 12 hours. After the usual trueing and balancing, such wheels may be used to grind such materials as titanium, carbide tools, glass, porcelain and even to grind silicon carbide. Due to their light weight they may be safely operated at higher speeds than can silicon carbide wheels of like shape and size.

Other bonds familiar to the abrasive industry can also be used as will be obvious to those skilled in this art.

I find also that my materials may be advantageously used as an abrasive diluent admixed with diamonds in the manufacture of so-called diamond wheels in place of the silicon carbide normally so used as is familiar to the abrasive industry. When such "diamond" wheels are made of mixed materials, the swarf of partially used grains which become loosened and pull out, and also unused portions of the abrasive body, are usually saved and an effort made to reclaim the costly diamonds. The densities of diamond and SiC are however so close together that this is a difficult problem. With my light abrasives however the difference is substantial and the separation can be made much more easily using socalled heavy liquids such as Bromoform $CHBr_3$, density 2.85, or acetylene tetrabromide $CHBr_2$—$CHBr_2$ density 2.96, thus reducing the cost of reclaiming the diamonds.

Advantage may also be taken of my low density abrasive materials of the aluminum-silicon-boron family by blending them with heavy materials such as a fusion of 85% $ZrO_2$ and 15% $TiO_2$ (specific gravity about 5.35) whereby the advantages of the heavy tough material may be utilized without unduly increasing the total weight of grinding wheels made therefrom. For such purposes I admix my new material with the heavy abrasive (density greater than 5.0) in a ratio from 3:1 to 1:3 by volume and bond the mixture in the usual way. Wheels so made are safer and more suitable for high speed operation than those made with the heavy abrasive alone.

In summary, I may point out the advantages of my invention as follows:

1. A composition of matter to be used for an abrasive, a refractory material, consisting essentially of a fused mixture of silicon, aluminum and boron, in such relative proportions that their ratios fall within area GHKJ of the accompanying diagram, said composition being characterized by its extreme hardness and low specific gravity relative to similarly used materials.

2. The composition of claim 1, wherein said composition contains up to 30% by weight of carbon.

3. The composition of claim 1, wherein the specific gravity of the composition is no greater than 3.0.

4. A grinding wheel, comprising a mixture of granules of diamonds and fused granules of a composition consisting primarily of silicon, aluminum, and boron in such relative proportions that their ratios fall within area GHKJ of the accompanying diagram, and which are characterized by their extreme hardness and low specific gravity relative to other abrasive compositions, both types of granules being intermixed and held together in fixed relation by a phenolic resin binder.

5. A grinding wheel comprising, a mixture of abrasive granules of density greater than 5.0 and fused granules of a composition consisting essentially of silicon, aluminum and boron in such relative proportions that their ratios fall within area GHKJ of the accompanying diagram, said types of granules being mixed in a ratio between 1:3 and 3:1 by volume, and held together in fixed relation by a phenolic resin binder.

6. A refractory article consisting of a fused mixture of at least 10% silicon together with aluminum and boron in such relative proportions that their ratios fall within the area of GHKJ of the accompanying diagram, plus up to 30% carbon, and composition being characterized by its extreme hardness and low specific gravity relative to other refractory materials.

7. A fused composition of matter consisting essentially of aluminum, silicon and boron in ratios falling within the area GHKJ of the accompanying diagram, and up to 30% by weight of carbon, the specific gravity thereof being no greater than 3.0.

References Cited by the Examiner

UNITED STATES PATENTS

| | | | |
|---|---|---|---|
| 555,796 | 3/1896 | Whitehead | 23—14 |
| 2,325,181 | 7/1943 | Fitzgerald | 106—68 |
| 2,461,146 | 2/1949 | Cress | 106—68 |
| 2,672,399 | 3/1954 | Wainer | 23—14 |
| 2,940,841 | 6/1960 | Gregor et al. | 51—298 |
| 3,016,288 | 1/1962 | Andrieux et al. | 23—204 |
| 3,048,493 | 8/1962 | Robie | 51—307 X |
| 3,069,238 | 12/1962 | McMullen et al. | 23—204 |
| 3,081,161 | 3/1963 | Cantrell | 51—298 |
| 3,104,939 | 9/1963 | Vogt et al. | 23—204 |

ALEXANDER H. BRODMERKEL, *Primary Examiner.*

MORRIS LIEBMAN, *Examiner.*